United States Patent [19]

Ishida

[11] Patent Number: 5,294,461

[45] Date of Patent: Mar. 15, 1994

[54] PULTRUSION PROCESS FOR PREPARING COMPOSITES

[75] Inventor: Hatsuo Ishida, Cleveland, Ohio

[73] Assignee: Edison Polymer Innovation Corporation, Brecksville, Ohio

[21] Appl. No.: 861,346

[22] Filed: Mar. 30, 1992

Related U.S. Application Data

[63] Continuation of Ser. No. 303,919, Jan. 30, 1989, abandoned.

[51] Int. Cl.<sup>5</sup> ............................................. B05D 3/12
[52] U.S. Cl. .................................... 427/293; 427/358; 427/385.5; 427/387.8; 156/166; 156/181; 156/244.4; 264/136; 264/137; 264/174
[58] Field of Search ................... 427/358, 389.8, 385.5, 427/289, 293; 264/211.25, 136, 137, 174; 156/181, 166, 244.11

[56] References Cited

U.S. PATENT DOCUMENTS

| | | | |
|---|---|---|---|
| 4,098,861 | 7/1978 | Bassini | 264/174 |
| 4,541,884 | 9/1985 | Cogswell | 156/166 |
| 4,635,432 | 1/1987 | Wheeler | 57/221 |
| 4,769,286 | 9/1988 | LeNoane | 427/385.5 X |

FOREIGN PATENT DOCUMENTS

| | | |
|---|---|---|
| 0170245 | 2/1986 | European Pat. Off. . |
| 052941986 | 11/1988 | European Pat. Off. ..... B29C 67/14 |
| 0269197 | 6/1989 | European Pat. Off. . |
| 0320654 | 6/1989 | European Pat. Off. . |
| 2101033 | 1/1983 | United Kingdom . |

OTHER PUBLICATIONS

Cho et al, "Experimental Studies of Pultruded Fiber Reinforced Nylon-6 Composites", 47th Annual Conference, Composites Institute, The Society of the Plastics Industry Inc., Feb. 3-6, 1992, Session 2-C, pp. 1-7.

Ishida & Rotter, RIM-Pultrusion of Thermoplastic Matrix Composites, 43rd Annual Conf. Composite Inst, The Society of the Plastic Indus. Feb. 1-5, 1988.

Primary Examiner—Jaynce Bell
Attorney, Agent, or Firm—Oldham, Oldham & Wilson Co.

[57] ABSTRACT

An improved pultrusion process for preparing composites comprises combining polymer precursors in a mixer and continuously introducing the resulting mixture, together with reinforcing fibers, into an impregnation chamber maintained under conditions such that the mixture remains in liquid form of low viscosity. The impregnated fibers are continuously withdrawn from the chamber through a die in which polymerization of the precursors takes place to form the desired composite.

19 Claims, 1 Drawing Sheet

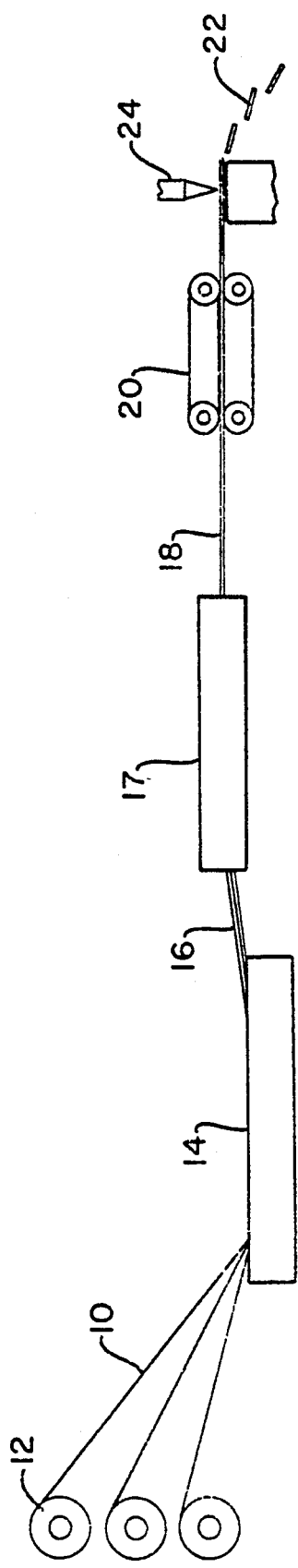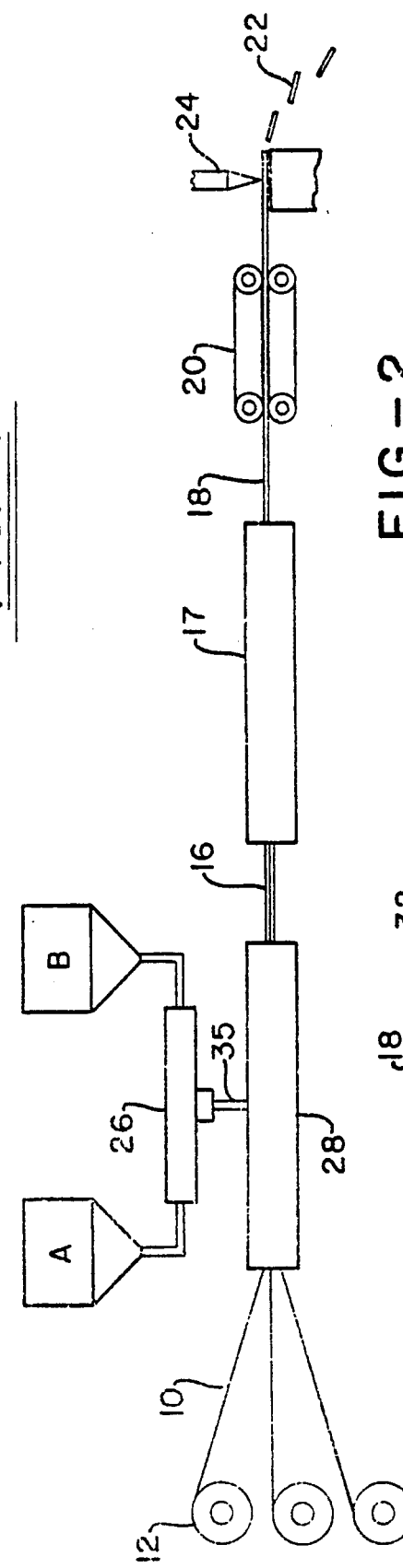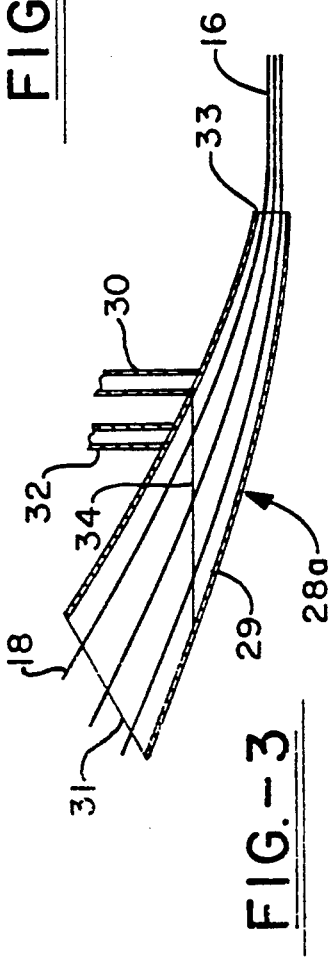

PULTRUSION PROCESS FOR PREPARING COMPOSITES

This is a continuation of copending application Ser. No. 07/303,919, filed on Jan. 30, 1989, now abandoned.

TECHNICAL FIELD

This invention relates to processes for forming fiber reinforced plastic matrices. More particularly, this invention relates to composite structure formed by pultrusion in which the plastic material constitutes the matrix or continuous phase, and reinforcing fibrous material makes up the discontinuous, discrete phase. Specifically, this invention relates to pultrusion processes which employ polymer precursors which react in the presence of reinforcing fibers during a pultrusion process, thereby forming composite structures with advantageously high fiber content and essentially continuous length.

BACKGROUND OF THE INVENTION

In recent years, the use of the pultrusion process to form composite structure has become increasingly popular since it enables such structures to be fabricated on a continuous basis. As the process is commonly practiced, the reinforcing material, for example, glass filaments, or other reinforcing fibers such as carbon and high strength organic fibers, combined in associated groupings or "tows" are passed through a tank containing the polymer which is to form the continuous phase in the form of a liquid solution, or in melted form. The plastic coated tows are thereafter drawn through a heated die, the coated tows emerging therefrom as a relatively rigid composite. In the case of pultrusions which employ thermoplastic polymers, the pultruded products can thereafter be subdivided into short segments, commonly known as "prepreg", which can be injection or compression molded to form articles of superior strength.

In carrying out the process according to the procedures previously known, however, and with reference to the use of thermosetting polymers as the continuous phase, the polymers must undergo a time-consuming condensation reaction which results in a high degree of polymerization shrinkage, in addition to the normal thermal shrinkage. Consequently, in order to avoid cracking of the composite caused by shrinkage, the cure cycle must be undesirably slow and carefully controlled.

When resort is to thermoplastic polymers, on the other hand, polymers with advantageously high glass transition temperatures, $t_g$, also have undesirably high viscosities, even at elevated temperatures. Consequently, in order to reduce their viscosities so that "wetting" of the reinforcing filaments can take place to the degree necessary, it is desirable to heat the materials to as high a temperature as possible, but below their decomposition point. Unfortunately, however, the difference between the temperature at which practical viscosities are experienced, and that at which polymer decomposition commences is frequently relatively small, making control of the process difficult.

The problem of filament wetting has previously been recognized, and various methods have been proposed to avoid it, for example, as shown in European Patent Application Publication Nos. 0 056 703, and 0 102 159. Such methods have not been altogether successful, however, at least to the fact that they present other disadvantages, for instance, in some cases a need to melt the polymers. In instances where thermoplastic polymers must be melted to carry out the required coating of the filaments, the polymerization, grinding, and melting steps preparatory to the coating operation involving processing and energy expenditure which are costly, and thus desirable to avoid if possible. Furthermore, maintaining a polymer in a melting condition over protracted periods inevitably leads to the gradual degradation of the polymer, detrimentally influencing its physical properties.

In addition, and irrespective of the nature of the system used to coat the filaments during the pultrusion process, it is frequently difficult to adequately wet the filaments, due to the relatively high viscosities of the coating liquid. Uncoated, or improperly coated filaments are prone to abrasion damage in subsequent handling and processing, leading to broken and, therefore, shortened filaments which provide poor physical properties in the composite, particularly in making prepreg for injection molded products. Consequently, poor wetting tendencies must be offset either by lowering the processing speeds, resulting in increased cost, or undesirably reducing reinforcing material loadings, detrimentally influencing physical properties, or both.

DISCLOSURE OF THE INVENTION

In view of the preceding, it is a first aspect of this invention to improve polymer wetting of reinforcing filaments in pultrusion processes.

A second aspect of this invention is to improve the protection of pultruded filaments by improving the extent to which the filaments are covered by the polymers employed in the pultrusion process.

Another aspect of the invention is to form a polymer in-situ in the presence of the filamentary material to be coated during the pultrusion process.

An additional aspect of this invention is to contact the filaments being pultruded with relatively low viscosity materials that are capable of binding to form a protective polymeric coating about such filaments.

A further advantage of this invention is to allow pultruded filamentary material to be coated with thermoplastic polymers without preforming the polymers, grinding, and then melting them prior to their contact with the filamentary material to be coated.

Yet another aspect of the invention is to allow the pultrusion of composite materials which have a increased loadings of reinforcing materials, relative to the polymeric material present.

Still an additional aspect of this invention is to make it possible to carry out pultrusion processes at increased line speeds.

Another aspect of this invention is to make possible the pultrusion of composites formed from polymeric materials having desirably high glass transition temperatures.

The preceding and additional aspects of the invention are provided by a process for preparing composite materials forming a liquid mixture of polymer precursors, impregnating composite reinforcing filamentary material with said mixture, and thereafter reacting said precursors to form a polymer in the presence of said filamentary material during the pultrusion of said mixture and said material through a die.

The preceding and other aspect of the invention are provided by a process of preparing composite prepreg material forming a liquid mixture of polymer precursors in a mixer, impregnating the reinforcing filamentary material with said mixture in an impregnator apparatus, thereafter reacting said precursors to form a polymer while pultruding the precursor through a die to form a solid composite structure, and thereafter, subdividing said composite structure into segments to form fiber reinforced composite prepreg adapted for use in an injection molding machine and if desired, injection mold said prepreg in an injection mold machine. The same procedures can be adopted for compression molding.

BRIEF DESCRIPTION OF THE DRAWINGS

The invention will be better understood when reference is made to the following drawings, which like numbers refer to like parts, and in which:

FIG. 1 is a schematic representation of a prior art pultrusion process.

FIG. 2 is a schematic representation of a pultrusion process of the invention.

FIG. 3 is a cross-sectional view of a polymer impregnating chamber of the invention therein.

BEST MODE FOR CARRYING OUT THE INVENTION

FIG. 1 shows a schematic representation of a prior art pultrusion process in which continuous filaments 10 are unwound from spools 12 and passed through a coating tank 14 containing a melt or liquid resin to be coated. The coated filaments 16 proceed from the tank to a heated die 17 from which they are drawn by a puller device 20 prior to being chopped into prepreg material 22 by a cutter device 24.

In the pultrusion process, continuous filaments, that is, any filamentary material in which the fibers or filaments are long enough to provide a roving or toe of sufficient tensile strength, are pulled through a polymer or resin tank, and subsequently through a heated shaping die where the resin is cured. A traveling cut-off saw is located just passed the puller mechanisms, allowing the process to be operating continuously.

It is the process that has been practiced in the past, it suffers from the fact that in the case of heated tanks containing a melted resin, the resin contained therein has a limited pot life, due to the fact that it gradually degrades while held at elevated temperatures. In the case of a thermosetting resin, a limited pot life is due to the gradual polymerization of the resin in the presence of polymerization initiators. Furthermore, as previously pointed out, wetting of the filaments is often inadequate as a result of the higher than desirable viscosities of the resin, in consequent inferior wetting characteristics. Poor wetting leads to improperly coated filaments which are susceptible to damage from abrasion, for example, during screw injection in injection molding operations, due to the inferior protection of individual filaments. The applied shear forces during such processing rotate and bend the fibers, causing it to break when it reaches a critical radius. Surface damage detrimentally affects the critical radius, compared to protected fibers, resulting in excessive breakage and shorter fibers, and thus, decreased strength characteristics of products molded from such products. Even without a secondary processing method, the resultant composite with inadequate wetting leads to weakness due to the stress concentration at the voids near the fiber/matrix interface.

An essence of the present invention is the provision of a method by which the filaments can be contacted by the lower viscosity, better wetting polymer precursors, rather than by the polymer itself. Better wetting leads to superior protection of the fibers, and also allows more fibers to be incorporated at a given weight of polymer, both effects resulting in composites having superior strength.

FIG. 2 illustrates a schematic representation of the pultrusion process of the invention. As shown, the components viz. the precursors required to form the desired polymer, as shown in the Vessels A and B respectively, are introduced into a mixing device 26 where they are intimately combined. The mixture of polymer precursors is thereafter fed into a resin impregnation chamber 28 into which filaments 10 are drawn from storage usually viz. spools 12. Intimate contact and thorough wetting of the filaments 10 is achieved in the impregnation chamber 28, the impregnation process taking place in the chamber being controlled so that no significant polymerization takes place therein. The coated filaments 16 leaving the resin chamber 28 are directed into a die 17 where the desired polymerization takes place, typically by heating the coated filaments to the reaction temperature of the polymer precursors to form the composite product. Usually the coated fibers 16 are not exposed to the air, though it is not an absolute requirement for some resin systems. However, resin systems that are sensitive to atmospheric water and/or oxygen need to be shielded from the environment. The resulting composite, a relatively rigid material is drawn by the puller device 20, which serves as the driving force for the entire process, from the die, and directed to a cutting device such as a traveling saw 24 where the composite is subdivided into segments of the desired length.

The process has been referred to as a "RIM pultrusion", since it combines the technique of reaction injection molding (RIM) with pultrusion processing. The combination provides the unique and unobvious advantage of impregnating the fibers with materials of low viscosity, and therefore, greatly superior wetting characteristics.

Inasmuch as the prepolymerization, grinding, and either melting or solution steps of the prior art processes are avoided, the RIM pultrusion process involves relatively low capital investment, the reduced equipment required being reflected in substantially less maintenance.

Furthermore, in addition to the high mechanical strengths resulting from the excellent fiber wetting, and the low energy consumption entailed in the processing, high production rates are inherent in the process due to the short reaction time of the polymer precursors, and the speed with which impregnation of the fibers with the low viscosity precursors takes place. Inasmuch as the polymerization reaction does not occur before the die, pot life problems resulting from polymer degradation are avoided, leading to the more efficient use of raw materials. An additional advantage of the RIM pultrusion process results from the fact that the exotherm produced by the reaction of the polymer precursor decreases the amount of heat that must be supplied to the die, resulting in energy savings.

In order to achieve satisfactory reaction rates, it has been found desirable to select polymer precursors capable of reacting in the die within no more than about 120 seconds, more desirably, from about 5 seconds to about 30 seconds. The viscosity of the polymer precursors during impregnation will be, though not limited to, in the range from about 1 to 500 centipoise preferably at the processing temperature, allowing complete wetting of the individual filaments, thus ensuring good abrasion resistance, reducing fiber breakage resulting from abrasive surface damage, and high fiber loading.

Advantageously, precursors can be used which produce polymers exhibiting a glass transition temperature Tg, of at least 180° C. or above, preferably from about 180° C. to 230° C., as composites formed therefrom exhibit desirable resistance to high temperature environments without undergoing unacceptable loss of physical properties.

The RIM pultrusion process of the invention is useful in fabricating a variety of composite shapes including rods, sheets, tapes, and other profiles. In addition, when the continuous phase is a thermoplastic material, the process is particularly useful in the preparation of prepreg for injection molding, compression molding and other thermoforming techniques. In the preparation of a prepreg material, the RIM pultruded composite will be chopped into short rods, for example, from about 0.25 to 1 inch long, which will then be molded into a final composite shape at a processing temperature of the corresponding resin. Products so produced have excellent physical characteristics, which is surprising in view of the fact that typically injection molded products from short fiber reinforced composites have mechanical properties inferior to compression molded composites from the same length of the starting fibers, such inferiority is not due to the initial lengths of the fiber composites but rather is the consequence of fiber damage experienced during the injection molding operation. Such damage in the case of injection molded products from prior art composite materials commonly reduces the aspect ratio, i.e. the ratio of length of the fiber to its diameter, from an initial value, for example, of 10,000 to below 500 after injection molding. The reduction is to be considered in spite of the fact that the strength of short fiber reinforced composites approaches that of long fiber composites when the aspect ratio is in the 1,000 to 2,000 range; consequently, maintenance of the initial fiber length is essential for good mechanical strengths. The significant advantage of RIM-pultruded composites, for example, those employing Nylon, results from the fact that a large portion of the injection molded fibers exhibit an aspect ratio close to the initial length of the fibers, resulting in greatly improved mechanical properties.

Any of various resins which can be reaction injection molded may be used in the RIM-pultrusion process of the invention including either those of the thermoplastic, or thermosetting type. Among materials that can be successfully employed in the process are, for example, the well known Nylons, viz., nylon 6, such as the in-situ polymerization of E-caprolactam, polyurethanes, polyacrylates, polymethacrylates, epoxies, poly(dicyclopentadiene) and others. Filamentary material suitable for the purposes of the invention include filaments and fibers made from carbon, high modulus synthetic fibers, including high modulus polyolefins such as polyethylene, polyester, aromatic polyamides, similar fibers, and glass.

The fibers may be in any form having sufficient intrepidity to be pulled through the pultrusion process, and conveniently may consist of bundles of individual fibers or filaments, i.e., "rovings" in which substantially all the fibers are aligned along the length of the bundles. Any number of such rovings may be employed, and in the case of commercially available glass rovings, for example, each roving may consist of up to 8,000 or more continuous glass filaments. Carbon fiber tapes containing up to 6,000 or more carbon fibers may also be used as may be cloths woven from rovings. If desired, the fibers may be provided with any of the conventional surface sizes, particularly those designed to maximize bonding between the fibers and the matrix polymer.

FIG. 3 illustrates a cross-sectional view of a polymer impregnating chamber of the invention, generally 28a. As shown, the resin impregnation chamber comprises a housing 29 which includes a resin inlet 30, and, where the precursors are detrimentally affected by contact with oxygen, inlet 32 for a purging gas such as, for instance, nitrogen. The preferred embodiment shown, contemplates a tapered construction from the fiber inlet 31, to the point 33 where the impregnated fibers leave the chamber. The tapered construction is of significant advantage since it allows relative dispersal of the entering filaments, and, therefore, promotes intimate penetration of the polymer precursors in and around the fibers while the narrower outlet 33 provides a "squeezing" of the filaments, forcing them into a more closely packed formation, resulting in excellent fiber wet-out and higher glass contents, usually 30% to 65% by volume and preferably 50 to 65% by volume of reinforcing material. The tapered design shown also voids "dead zones" where the resin might collect and cure, a phenomenon to be avoided, particularly where the matrix materials employed have relatively short gel times. FIG. 3 illustrates a resin chamber in which the inlet 31 is somewhat higher than the point of entry of the resin inlet 30 to the housing 29. The difference in elevation tends to control the level 34 of resin in the chamber, minimizing the possibility that back flow of the resin out of the fiber entrance 31 will occur. Thus, the fibers 31 are drawn through a pool of the polymer precursor mixture. The design described above is for a horizontal pultrusion machine. Another class of pultrusion machine, termed vertical pultrusion machine, can also be used for RIM-pultrusion. In this case, the resin impregnation chamber is typically symmetrical in shape and placed vertical, namely the fibers tows 18 and 16 form vertical lines.

In order to avoid premature reaction of the polymer precursors, it is desirable that the temperature of the resin impregnation chamber be controlled within the range where the tendency of the precursors to react is minimal, but sufficiently high to maintain the reacting materials in the liquid state. The temperature will depend upon the nature of the matrix material being used, and in the case of E-caprolactam will be in the order of around 80°–100° C., having a viscosity of 1 to 100 centipoises. In addition, and also for the purpose of minimizing premature reaction of the resin precursors, the distance between the mixer 26 and the resin impregnation chamber 28 should be minimized to the extent possible. In practice, the former distance will be as little as about 4 inches. Minimizing premature reaction tendencies of the precursors enhances fiber wet-out, and helps to avoid plugging problems due to gel formation, prior to the point at which the components of the composite reach the die. With those precursors that have a limited range of temperature for mixing and reacting the mixer 26 can be essentially a T-pipe connection to give an inline mixing to drop the mixture of precursors into the impregnator 28a.

While the amount of reinforcing fiber used to produce the composites of the invention may be varied, it is often desirable to maximize such content to the extent possible, but short of the point where wetting of the fibers is adversely affected. The process of the invention permits comparatively high loadings of fibers to matrix to be achieved, for example, as much as about 60–65% by volume.

The temperature of the die 17 will be maintained at the temperature sufficient to assure reaction of the precursors, and will vary depending upon the nature of the precursors. In the case of Nylon-6, for example, the pultrusion die will be maintained at about 150° C. to 170° C. Since reaction of the precursors is to be avoided in the impregnation chamber 28, it follows that the temperature of the die will always exceed that of the resin impregnation chamber. In the case of highly reactive precursors, for instance, those which react at or about room temperature, heating of the die may be unnecessary, but cooling of the resin chamber may be required. Also, those reacting at lower temperatures can be advantageously mixed in so-called inline mixers.

While not intended to be limiting in nature, the following example is illustrative of the nature of the invention where all parts and percentages are by weight unless otherwise designated.

EXAMPLE

In an experiment designed to demonstrate the RIM pultrusion of the invention, E-caprolactam was combined with phenyl isocyanate and sodium hydride, the latter components representing the system initiator and catalyst respectively. The E-caprolactam was dried for 24 hours at 50° C. in a vacuum oven prior to use to avoid problems resulting from moisture sensitivity of the Nylon reaction. The polymer precursors described were prepared as two master batches under nitrogen. The sodium hydride and phenyl isocyanate components were prepared as solutions having a concentration of from between 30 to 40 mole percent. The solutions were then diluted with pure E-caprolactam to form solutions of lower reactivity.

The glass fiber rovings were those marketed by Owens Corning Fiber Glass of the 473BB225 yield, type 30, which included the Nylon compatible sizing agent such as the well known aminosilane. The glass fibers were dried prior to use.

The pultrusion machine employed was a PULSTAR 804 model, manufactured by Pultrusion Technologies, Inc. The die employed was three feet long and produced a three-eighth diameter circular profile. The die was equipped with three ten inch electric heating cartridges having separate controllers.

The resin impregnation chamber was constructed from copper tubing and tube fittings and had a "Tee" shape. The distance between the mixer, also Tee shaped and the resin chamber was about four inches, while the distance from the resin chamber to the die entrance was about eight inches. During the experiment, the resin chamber was maintained at about 80° C. The resin chamber was angled upward slightly 5 to 15 degrees at the fiber entrance to help prevent resin back flow from entrance and to form a pool of precursor mixture to cover the fibers as the composite leaves end 33.

The pultrusion die temperatures were 150° C. at the die entrance, 170° C. at its middle, and 160° C. at the end of the die. The pumps used to propel the precursor solutions to the mixer were maintained at about 100° C., while the feed lines and resin chambers were kept at about 80° C. The latter temperature being low enough to assure little to no reaction prior to the die. The process was controlled at a line speed of about eighteen inches per minute and yielded a composite having a fiber volume percent, of 51% achieved with 40 tows which was measured by pyrolizing the composite product.

The resulting composite profile was compared to the standard profile prepared at an average die temperature of 160° C., a fiber speed of 18 inches per minute, using 40 fiber rovings, and a reactive component level of 2%.

Comparison of the physical testing results of the composite of the invention, relative to that of the standard profile showed the composite of the invention to have significantly better damping properties, and indication of superior physical characteristics.

Instead of the in situ produced Nylon of example I other polymers may be used. For instance an epoxy resin such as the commercial Bis-phenol A epoxy resin used with a polyamine could be used as feed to the pultrusion machine by adjusting the temperature so the epoxy resin cure is not initiated by the amine until it enters the die. Likewise the reactive hydrogen containing materials such as hydrocarbon polyols, polyether polyol or polyester polyols are reacted with an organic polyisocyanate such as toluene diisocyanate or MDI to form a prepolymer which reacts with a curative such as ethylene glycol, butanediol, or diamines to yield the desired polyurethane or alternatively, the reactive hydrogen material is reacted with the polyisocyanate and a curative to give the desired polyurethane.

The acrylics viz. alkyl acrylate or methacrylate may be used as monomers or they may be polymerized to yield a polymer that is dissolved in a reactive monomer. Representative reactive monomers are the alkyl, arylan cyclaakyl arcylates or methacrylates, vinyl acetate, etc. The curing of acrylics can be effected with a free radical generator such as the peroxides that decompose at the temperature of the material going through the die to effect the cure.

This method permits the precursor to be fed to the impregnator at a temperature at least 20° C. below the reaction temperature while the precursor has a low viscosity and wets the filaments and does not tray air due to the inherent low viscosity of the precursor. Thus, the resin loaded filamentry compositions are obtained having a loading of 30–65% by volume and preferably 50–65% essentially free of voids.

While in accordance with the patent statutes, the preferred embodiment and best mode has been described, the invention is not limited thereto, but rather is to be measured by the following claims.

What is claimed is:

1. A pultrusion process for preparing a fiber reinforced polymer composite, which comprises:
    (a) continuously pulling a roving or tow of continuous longitudinally aligned filaments successively through an impregnation chamber and a die;
    (b) continuously mixing the components required to form a polymer, said components including a reactive monomer, thereby forming a liquid precursor mixture including said reactive monomer and having a substantially lower viscosity than that of said polymer, and feeding the resulting precursor mixture to said impregnation chamber;
    (c) contacting said filaments with said precursor mixture in said impregnation chamber, thereby forming a coating of said precursor mixture on said filaments in said impregnation chamber, the conditions in said impregnation chamber being such that substantially complete wetting of said filaments by said precursor mixture takes place and such that substantially no polymerization takes place;

(d) directing the coated filaments from step (c) through a die and heating the coated filaments in said die to reaction temperature, thereby causing polymerization to take place in said die, wherein a solid composite comprising filaments coated with a solid polymer is formed; and (e) drawing said composite from said die.

2. A process according to claims 1 in which the temperature in said impregnation chamber is below reaction temperature and lower than the temperature in said die.

3. A process according to claim 1 in which polymerization in said die is substantially complete.

4. A process according to claim 1 in which said filaments are pulled downwardly and forwardly into said impregnation chamber and are then pulled in a generally horizontal direction from said impregnation chamber to said die.

5. According to claim 3 in which said filaments enter said impregnation chamber at a downward angle of about 5 to 15°.

6. A process according to claim 1 in which said filaments are at essentially ambient temperature before they enter said impregnation chamber and said impregnation chamber is maintained at a temperature below polymerization temperature.

7. A process according to claim 1 wherein said impregnation chamber comprises a tapered chamber having two open ends, including a larger end and a smaller end, wherein said filaments enter the larger end of said chamber from above at an angle thereto, and said components enter said chamber from an entry port in the side of said chamber, and impregnated filaments leave from the smaller end of said chamber.

8. A process according to claim 7 wherein said impregnation chamber also includes an entry port in the side thereof for the introduction of an inert gas.

9. A process according to claim 1 wherein said polymer is a thermoplastic.

10. A process according to claim 9 wherein said polymer has a glass transition temperature of at least 180° C.

11. A process according to claim 1 wherein said polymer is a member selected from the group consisting of Nylon 6, a polyurethane, an epoxy, a polymethacrylate, a polyacrylate, and a poly(dicyclopentadiene).

12. A process according to claim 1 wherein said filaments are selected from the group consisting of carbon, an ultra high modulus polyolefin, a polyester, an aromatic polyamide and glass.

13. A process according to claim 1 wherein said components comprise polymer precursors, said precursors are reacted to form said polymer while pultruding said precursors on said filaments through said die and wherein said solid composite is oriented and cured, and wherein said process further includes the step of subdividing said solid composite into segments to form a fiber reinforced composite prepreg adapted for use in an injection molding machine.

14. A process according to claim 1, wherein said solid composite is a fiber reinforced composite of less than 2% voids and a loading of about 50% to about 65% by volume of fiber.

15. A process according to claim 1 wherein said liquid precursor mixture comprises at least one precursor and an initator and is mixed at a temperature at least 20° C. below said reaction temperature.

16. A process according to claim 13 wherein said segments are about 0.25 to about 1 inch long.

17. A process according to claim 1 wherein the viscosity of said precursor mixture in said impregnation chamber is from about 1 to 500 centipoise.

18. A process according to claim 1 wherein the reaction time of said precursor mixture in said die is no more than about 120 seconds.

19. A process according to claim 1 wherein said precursor mixture is free of polymer.

* * * * *